C. W. GRAHAM.
METHOD OF MANUFACTURING GASKET LINED CAN ENDS AND APPARATUS THEREFOR.
APPLICATION FILED JUNE 22, 1917.

1,343,914.

Patented June 22, 1920.
8 SHEETS—SHEET 1.

C. W. GRAHAM.
METHOD OF MANUFACTURING GASKET LINED CAN ENDS AND APPARATUS THEREFOR.
APPLICATION FILED JUNE 22, 1917.

1,343,914.

Patented June 22, 1920.
8 SHEETS—SHEET 4.

Fig. 6

C. W. GRAHAM.
METHOD OF MANUFACTURING GASKET LINED CAN ENDS AND APPARATUS THEREFOR.
APPLICATION FILED JUNE 22, 1917.

1,343,914. Patented June 22, 1920.
8 SHEETS—SHEET 6.

WITNESSES:

INVENTOR
BY
ATTORNEYS

C. W. GRAHAM.
METHOD OF MANUFACTURING GASKET LINED CAN ENDS AND APPARATUS THEREFOR.
APPLICATION FILED JUNE 22, 1917.

1,343,914. Patented June 22, 1920.
8 SHEETS—SHEET 7.

WITNESSES:
INVENTOR
BY
ATTORNEYS

C. W. GRAHAM.
METHOD OF MANUFACTURING GASKET LINED CAN ENDS AND APPARATUS THEREFOR.
APPLICATION FILED JUNE 22, 1917.

1,343,914.

Patented June 22, 1920.

UNITED STATES PATENT OFFICE.

CHARLES W. GRAHAM, OF ALLENDALE, NEW JERSEY, ASSIGNOR TO AMERICAN CAN COMPANY, OF NEW YORK, N. Y., A CORPORATION OF NEW JERSEY.

METHOD OF MANUFACTURING GASKET-LINED CAN ENDS AND APPARATUS THEREFOR.

1,343,914.  Specification of Letters Patent.  Patented June 22, 1920.

Application filed June 22, 1917. Serial No. 176,269.

*To all whom it may concern:*

Be it known that I, CHARLES W. GRAHAM, a citizen of the United States, residing in Allendale, in the county of Bergen and State of New Jersey, have invented new and useful Improvements in Methods of Manufacturing Gasket-Lined Can Ends and Apparatus Therefor, of which the following is a specification.

This invention relates in general to the production of a gasket lining machine and the application of the gasket to the flange of a can end to subsequently form a packing between the can end and the can body when the end is applied.

The invention has a highly important use as applied to machines for applying such liners to can ends adapted to be double seamed, the liner included in such seam rendering the closure hermetic without the use of solder.

A principal object of the present invention is the provision of a machine of this character in which the gasket liner will be applied to an incompletely formed end, the subsequent completion of the formation of such end serving to hold the liner in place and insure against its being damaged in the handling or shipment of the end before application to the body and to insure against misplacement of the liner when the end is in the closing machine.

Experience has demonstrated that the smallest percentage of leakage of the filled and closed cans results when the liners are so held by the ends that the liner may have a slight relative bodily movement about the axis of the end when the seaming is taking place and to this end my invention contemplates the completion of the formation of the can end after the liner is applied to hold it loosely but permanently in place.

A further object of the invention is the provision of a machine of the character set forth which will be of high speed and positive operation giving a finished formation to the can end and thereby insuring an accurate feeding of the ends to the bodies in the closing machine.

A still further object of the invention is the provision of a machine for accurately truing and gaging the can ends in the final steps of the application of the liner and just prior to the delivery of the lined end from the machine.

Other objects and advantages of the invention will be apparent as it is better understood from the following description when considered in connection with the accompanying drawing illustrating a preferred embodiment thereof.

On the drawing 1 indicates as an entirety the main frame or casing of the machine which may be of any suitable construction. For illustration, it is shown in the nature of a casing 2 which is suitably attached to rear upright frames 3. In the upper bearings 4 there is a horizontal drive shaft 5 to which power is transmitted through the medium of the tight and loose pulleys 6, which pulleys 6 are rotated by some outside source of power, in the direction of the arrow as indicated on Fig. 2.

At fixed points upon the drive shaft 5 are secured the eccentrics 7 and 7' which are connected by suitable eccentric straps 8 and 8' and the pitmen 9 and 9' to the upper end of the slides 10 and 10'. The slides 10 and 10', as is apparent, have a vertically reciprocating motion through the guides 11 and 11', which guides are supported by the horizontal member 12. The member 12 is in turn, firmly attached by suitable means to the rear upright frames 3, as is illustrated on Fig. 1. To the lower end of the slides 10 and 10' are attached the center punch 13 and the ring or gasket punch 13'.

Figure 4:
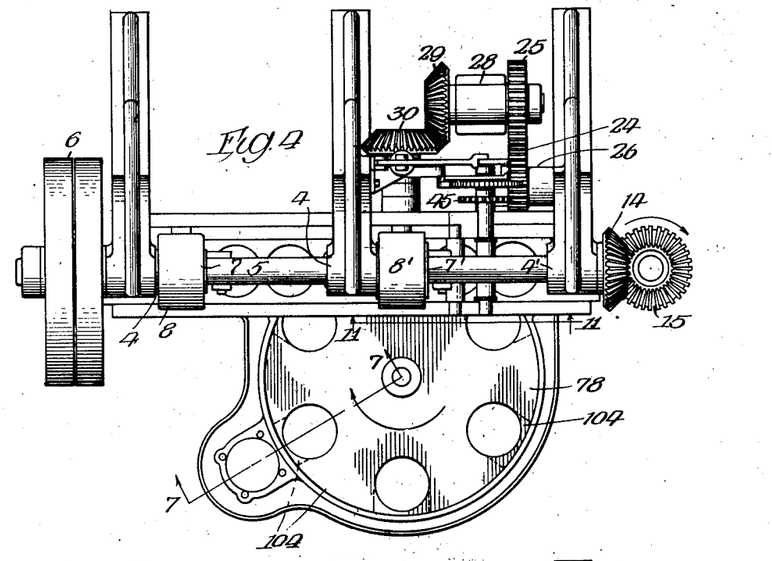
Fig. 4 is a plan view of Fig. 1.
Figure 5:
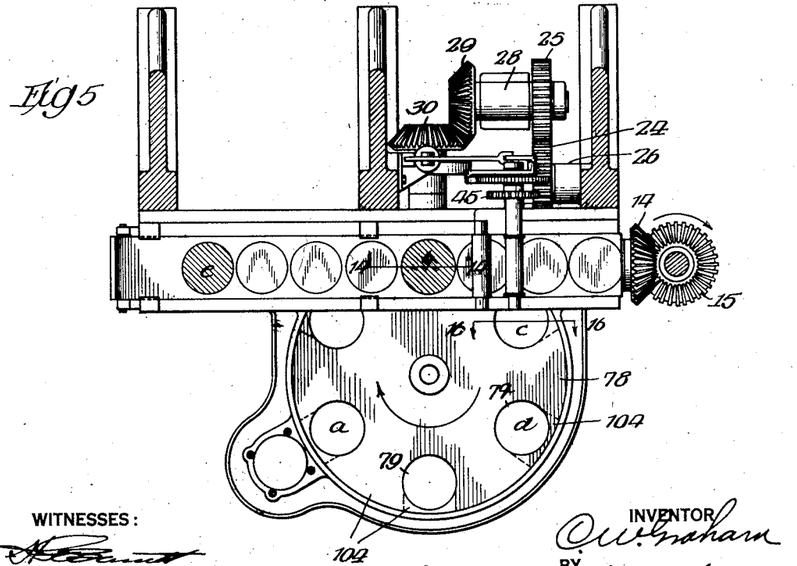
Fig. 5 is a sectional plan view taken on line 5—5 of Fig. 1 looking in the direction of the arrows.

Secured to one end of the horizontal drive shaft 5 is a miter gear 14, which meshes and transmits motion to its mate gear 15. The gear 15 is secured to the vertical drive shaft 16, which drive shaft 16 is mounted in the bearings 17 and 18 respectively. The bearings 17 and 18 are fastened by some suitable means to the upright member 3 as is indicated on Fig. 1. To the lower end of the vertical drive shaft 16 is attached a miter gear 19, which transmits motion to its mate gear 20, the gear 20 being secured to and transmitting motion to the shaft 21, Fig. 6. The shaft 21 has a bearing 22 in the casing 2 shown clearly on Fig. 6. Attached to and rotated by the shaft 21 is the spur gear 23. The spur gear member 23 is one of a train of spur gears, as 23, 24, and 25 shown plainly on Fig. 9. The gear 24, which is driven in the direction of the arrow by the gear 23, is mounted loose upon a short shaft having a bearing 26 in the upright member 3 shown clearly on Figs. 4 and 5.

Figure 3:
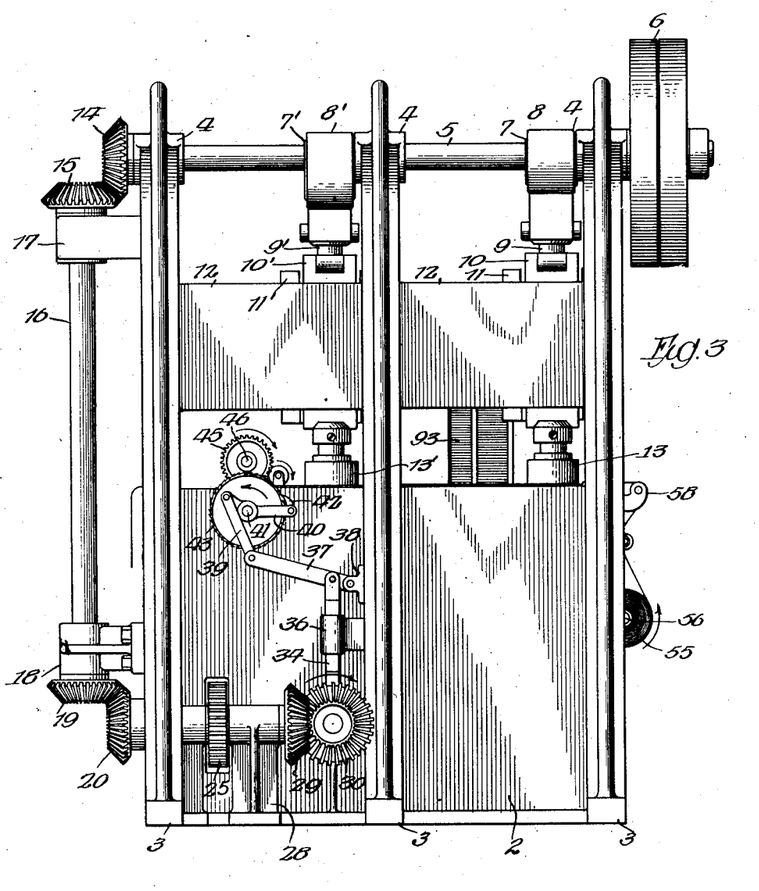
Fig. 3 is a rear elevation of Fig. 1 with all parts in same positions.

The gear 25 is mounted on a shaft 27 which shaft 27 has a bearing in the pedestal 28. To the other end of the shaft 27 is fastened a miter gear 29 which transmits motion in direction of the arrow to its mate gear 30 Fig. 3. The gear 30 is attached to and transmits motion to a shaft 31 which shaft 31 has a bearing 32 in the casing 2 Fig. 9. Attached to and rotated by the shaft 31 is a cam 33, timed to transmit vertical reciprocating motion to a rod member 34, having secured at its lowermost end a cam roller 35, which is acted upon by the cam groove in the face of the cam 33. The rod member 34 has a bearing in the bracket 36 which bracket is secured to the upright member 3 as shown on Fig. 3. The rod member 34 at its upper end is attached to a link member 37, which has a fulcrum in a bracket 38, being secured to the upright member 2 as shown on Fig. 3. The link 37 at its other end has a connection with a short link 39 which link 39 in turn is connected with the crank 40. The crank 40 has a fulcrum on the fixed shaft 41 and has attached to its opposite end a ratchet pawl 42. The pawl 42 engages the ratchet wheel 43 as shown on Fig. 3. The ratchet wheel 43 is mounted upon the fixed shaft 41, and is also secured by some suitable means to a spur gear 44 Fig. 9, which also is mounted upon the fixed shaft 41. The spur gear 44 meshes with a mate spur gear 45, which gear is feathered to a shaft 46. The shaft 46 is mounted on two brackets 47 and 48, which are fastened by some suitable means to a plate 49. This plate 49 is secured to the top of the casing 2 as shown on Fig. 1. In the brackets 47 and 48, there is also mounted a shaft 50. At a fixed point on the shafts 46 and 50 or at distances equal to the width of the paper web to be fed are mounted four feed wheels 51; and these feed wheels have fine teeth on their periphery, which, by contact with the edges of the paper web as they are revolved, feed the web as desired. Between the feed wheels 51 are mounted on the shafts 46 and 50, the rollers, preferably of hard rubber as 52. In conjunction with the feeding devices above mentioned, there is also mounted in the brackets 47 and 48, a shaft 53 which shaft 53 has mounted on itself another roller 54 similar to roller 52 as shown on Fig. 1.

Figure 1:
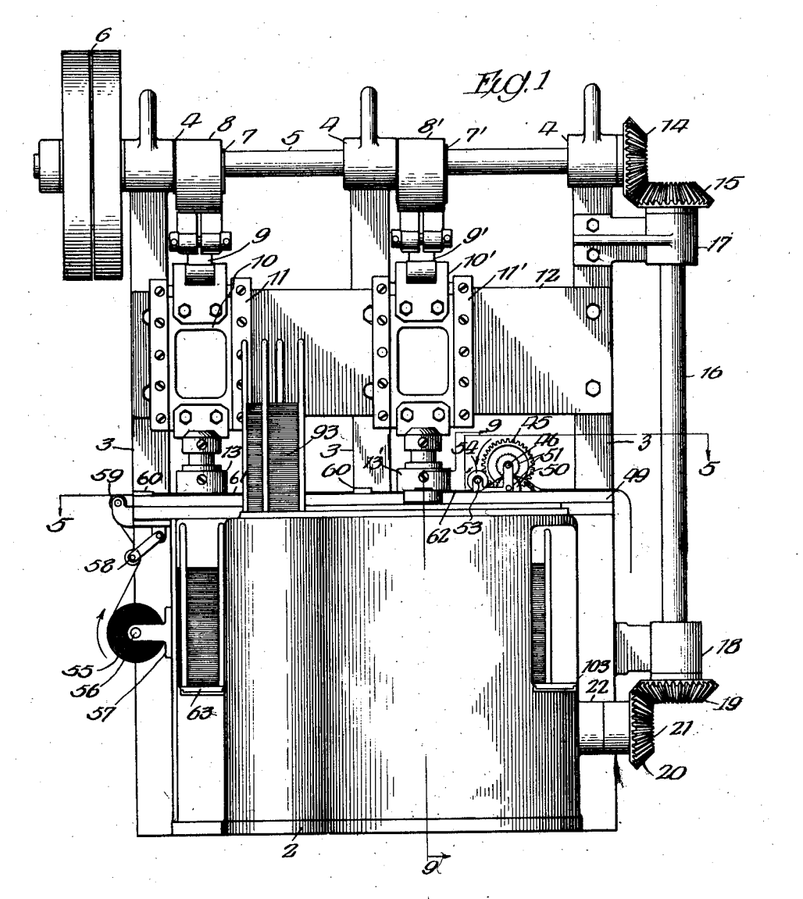
Figure 1 is a front elevation of the machine, showing the center and ring punches in their down position, and showing a stack of unlined can ends 93, a stack of center disks cut from the gasket material by punch 13 and a stack of lined can ends 103.
Figure 2:
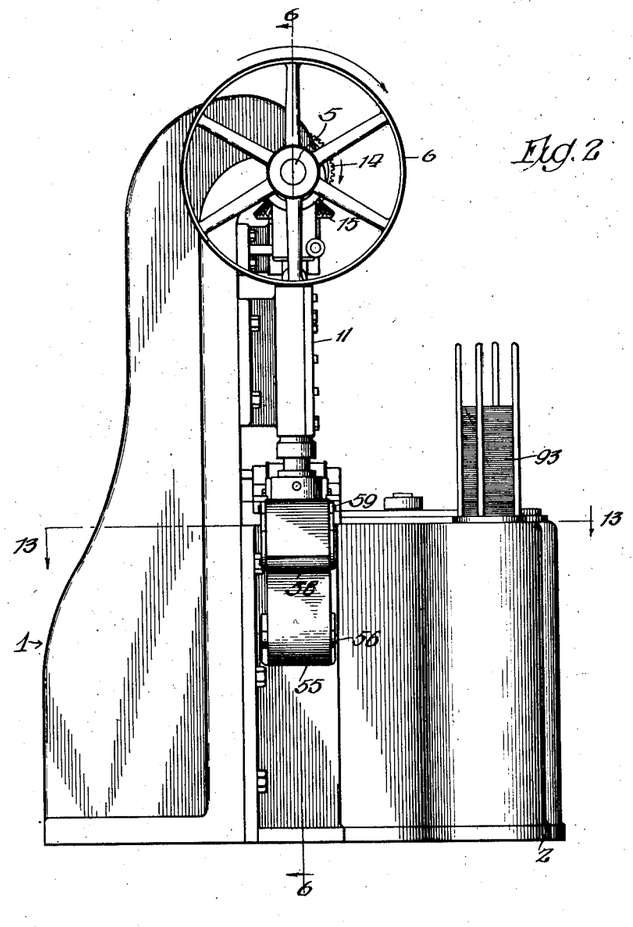
Fig. 2 is a side elevation, looking from the left of Fig. 1 with all parts in the same positions.

The paper supply is in the form of a roll 55′ Fig. 1, which is mounted on a shaft 56 supported in turn by a bracket 57. The bracket 57 is secured by some suitable means to the casing 2 as indicated on Fig. 1. The paper web 55 is threaded over the idler roller 58, thence over another roller 59 through alinement brackets 60 to the roller 54 and between the feed wheels 51 and the rollers 52 and thence to some outside source of discharge.

Figure 6:
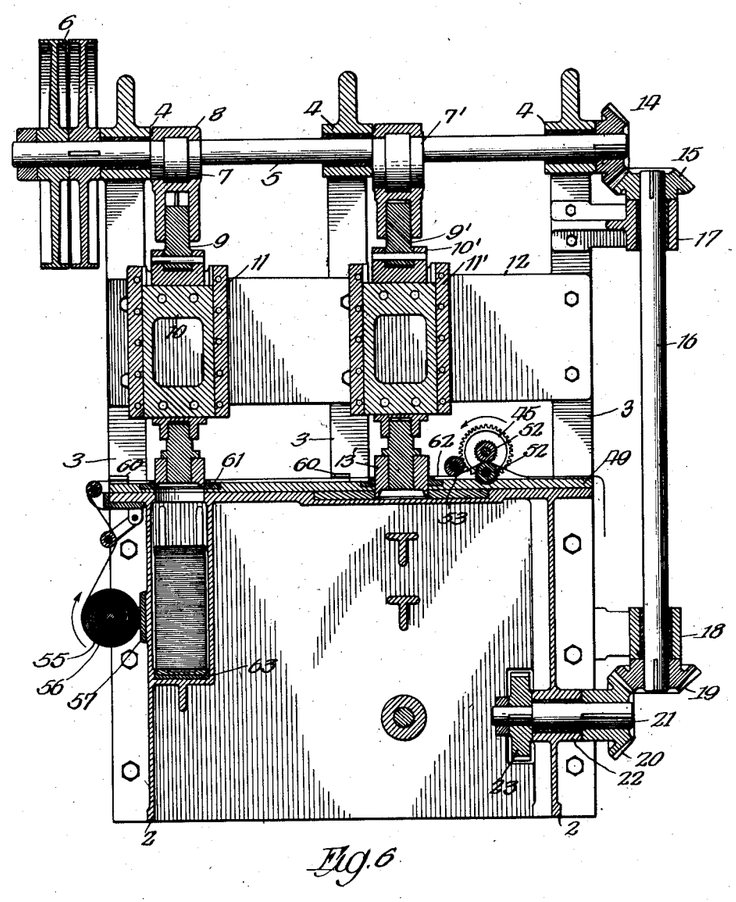
Fig. 6 is a vertical section taken on line 6—6 of Fig. 2 looking in direction of the arrows, showing in detail the stack of center disks, the thin flexible strip of gasket material, the center cutting dies and the gasket cutting and assembling dies.

At fixed points in the plate 49 are fastened the center die 61 and the ring die 62 as shown on Fig. 6 in section. Under the center die 61 in the casing 2 is a removable center stack 63 to which the centers drop after being punched from the paper web.

Figure 9:
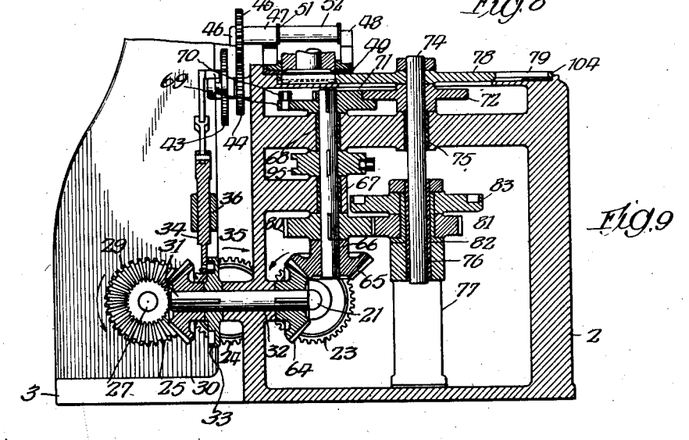
Fig. 9 is a vertical sectional view taken along the irregular line 9—9 of Fig. 1, but omitting the top part of the machine. This view shows the mechanism for operating the turret 78, the feed mechanism for the strip of gasket material and part of the main driving mechanism.

Referring to Fig. 9: On the shaft 31 is mounted a bevel gear 64 which meshes with and transmits motion to a mate gear 65. The gear 65 is mounted upon a vertical shaft 66 which shaft 66 has bearings 67 and 68 in the casing 2.

Figure 13:
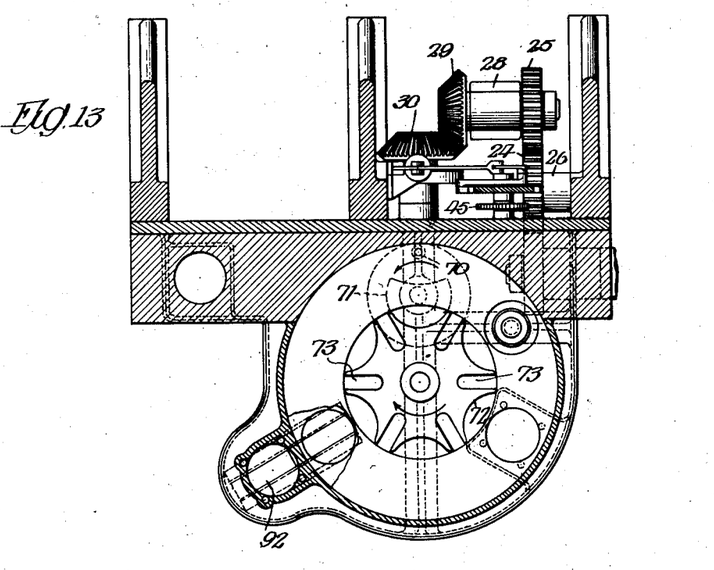
Fig. 13 is a sectional plan view taken on line 13—13 of Fig. 2. This line passes just under the lower face of the turret 78 and shows clearly the supporting ring 2 and the mechanism underneath.
Figure 14:
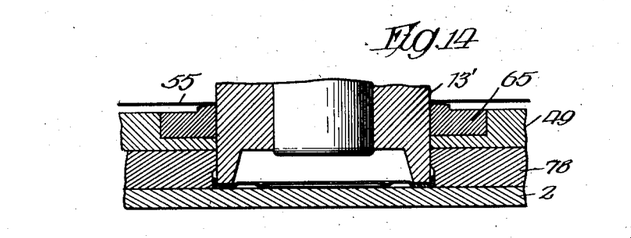
Fig. 14 is a vertical sectional view on line 14—14 of Fig. 5 showing an enlargement of the gasket cutting punch 13', die 62, plate 49, turret 78 and ring 2. The gasket cutting punch 13' is in its lowermost position and has just seated a gasket on the flange of the positioned can end.
Figure 15:
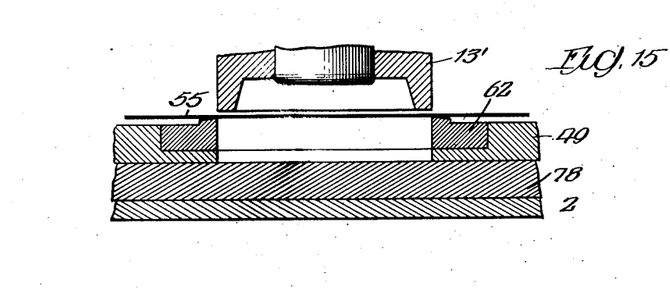
Fig. 15 is a like sectional vertical view showing the cutting punch 13' in its uppermost position, with the strip of gasket material 55 positioned ready to be cut and the turret 78 in transit moving from one station to the next.

Secured to the upper end of the shaft 66 is a crank disk 69 being part of a Geneva motion. This crank disk has the usual driving roller 70 and it also has a locking circle 71 acting upon a star wheel 72. The star wheel 72 is of the usual form and has six slots 73 Fig. 13. The star wheel 72 is secured to and gives motion to a shaft 74. The shaft 74 has a bearing at its upper end as 75 in the casing 2 Fig. 9, and at its lower end 76 in a pedestal 77, which is attached to the frame 2 Fig. 9. Secured to the upper end of the shaft 74 is the turret 78. The turret has six pockets or recessed orifices 79.

Figure 10:
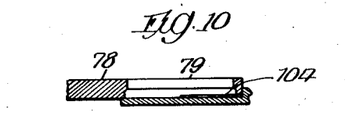
Fig. 10 is an enlarged sectional view of one of the recesses 79 in the turret 78, showing the enlarged portion for receiving the can ends and the curved face forming the die for curling the flanges of the can ends after lining and the cut out portion for admitting the can ends.

Referring to sectional view of one of these orifices, Fig. 10 it will be noticed that from the top down for a certain distance the pocket has a straight bore. This bore is large enough to admit a cut ring to pass. The bottom part of the straight bore curves out as indicated and graduates to another straight bore, which is larger than the upper one. This lower bore is sufficiently large enough to admit a can end having a vertical marginal flange which is uncurled so as to admit a cut ring. The purpose of the curved part of the pocket will be described later. The pockets 79 at their lower ends are slotted radially at 104 to admit the entrance of a can end from the can feed station.

Attached to and revolved by the shaft 66 Fig. 9 is a spur gear 80. This spur gear 80 meshes with and revolves a mate gear 81. This gear 81 is mounted upon a bushing 82, which bushing in turn has a bearing on the bearing 76 Fig. 9. Directly above the gear 81 is mounted an end feed cam 83, which is secured by some suitable means to the gear 81 shown on Figs. 7 and 8.

Figure 7:
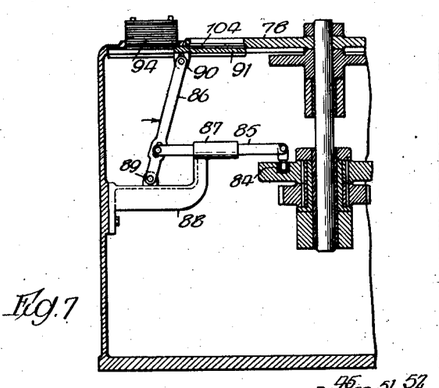
Fig. 7 is a vertical sectional view taken along line 7—7 of Fig. 4 showing in detail the feeding mechanism for placing the unlined and uncurled ends into the transporting turret 78, the mechanism being in the complete forward position.
Figure 8:
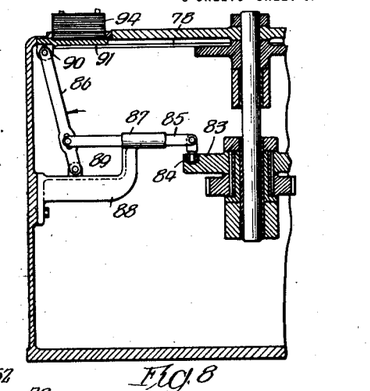
Fig. 8 is a sectional view along the same line as Fig. 7, but showing the feed mechanism in the complete out position.
Figure 11:
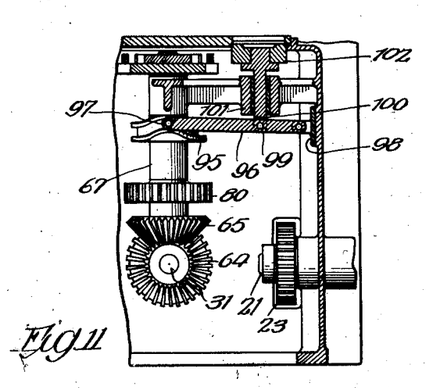
Fig. 11 is a partial vertical sectional view taken along line 11—11 of Fig. 4 and shows the mechanism for die curling the can ends after the gaskets are placed, this view showing the lifting plunger 102 in its uppermost position.
Figure 12:
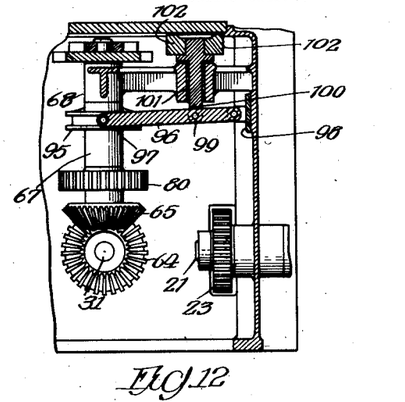
Fig. 12 is a similar view to Fig. 11, but with the lifting plunger 102 in its lowermost position.
Figure 16:
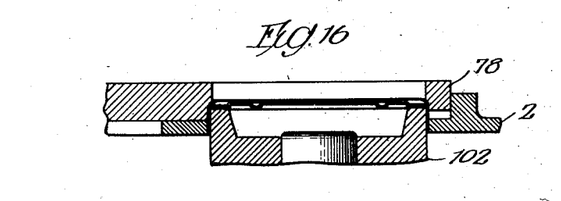
Fig. 16 is a vertical sectional view on line 16—16 of Fig. 5 showing the same recess in the turret and the same lined can end as in Fig. 14, but positioned over the lifting plunger 102, which forces the can end vertically against the curling die face to curl the flange over the applied gasket and loosely hold it in place. The plunger 102 is shown in its uppermost position, the flange of the can end being completely curled.
Figure 17:
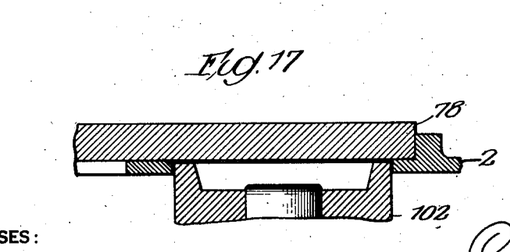
Fig. 17 is a sectional view on the same line as Fig. 16, but showing the curling plunger 102 in its lowermost position clearing the turret 78, the turret being in transit from one position to the next.

The end feed cam 83 receives and acts upon a cam roll 84 Figs. 7 and 8. To the cam roll 84 is secured by some suitable means a sliding link 85. The link 85 has a connection at its other end with a lever 86. The link 85 also passes through a guide 87 which guide 87 is a part of a bracket 88. The bracket 88 is attached to the casing 2. The rod 86 has a fulcrum 89 in the bracket 88 and at its other end 90 is connected with the can end feed plate 91. The feed plate 91 slides in a slot 92 in the casing 2 and acts upon the edge of the lowermost can end in a stack 93 which is supported by a can end stack arrangement 94 on the casing 2 Fig. 1. Upon the shaft 66 Figs. 9, 11 and 12 is secured a cam 95 which cam 95 acts upon a lever 96 through the medium of its cam roller 97. The lever 96 has a fulcrum in a bracket 98 which is secured to the casing 2. At the point 99, the lever 96 has a connection with a curling plunger stem 100. The curling plunger stem 100 has a bearing 101 in the casing 2 and at its upper end is fastened to a curling plunger 102. Two enlarged sectional views taken through the curling station are shown as Figs. 16 and 17. Fig. 16 shows the curling plunger 102 in a curling position. Fig. 17 shows the curling plunger 102 in a non-curling position. When the plunger lifts a can end having within its marginal flange a cut ring liner, the top edge of such marginal flange is forced against the inwardly curved part of the pocket 79, which curved part acts as a coöperating die to curve the top part of the flange evenly inward at all points of the circumference of the can end, so that said edge will be curled over and overhang the outer margin of the ring liner and prevent its escape from the can end; but the base of the vertical can end flange is not forced inward against the liner and the latter is left so as to be capable of free movement in its seat.

At a fixed point in the casing 2 Fig. 1, there is a removable stack 103 to which the lined can ends fall after lining, and when the stack is completed, it is removed from the machine.

The operation of the machine is as follows:

After a quantity of unlined and uncurled can ends are arranged in the stack 93, the strip of paper 55 is properly threaded through the feed rollers, the empty stack holders 63 and 103 are placed for receiving the center core disks and the completed ends, unfinished ends placed in the stack 93, and the machine is ready to start. The center core punch 13 and the gasket punch 13′ operate simultaneously each cutting on the same down stroke. The motion of the turret 78 is intermittent and is so timed with the stroke of the punches that an orifice is resting under the gasket punch each time the punch descends. The can end feed mechanism shown in detail in Figs. 7 and 8 is timed to feed a can end into an orifice each time the turret is at rest, the outer lower walls of the orifices 79 being cut away to admit can ends as shown at 104 Fig. 10, and by dotted lines in Figs. 4 and 5. The strip or web of paper is timed to feed forward a step at the same time the turret is rotated a step, so that each is at rest at the same time.

There is a space of three cuts between the punch that cuts the centers out and the gasket punch, this separation being necessary to give ample room for the turret 78. The turret 78 rests in a recess in the top of the bed 2 its lower edge being covered by a ledge which acts to confine and hold the can ends central with the recessed orifices after passing through the cut out portions 104.

The four operating stations on the turret are designated by letters, a, b, c, and d. While the turret is at rest, a can end is fed into a recess 79 at a, a gasket liner is cut and deposited on a can end flange at b, a can end with gasket applied is curled at c, a can end is dropped onto a stack at d and a center disk is cut from the web at e. As the punches 13 and 13′ ascend, the paper is fed forward one step and the turret is moved ahead one step, when the sequence of operations is repeated.

A very important feature of this machine lies in the curling of the can end flange by die action. Prior to my invention, this curling was done by rollers in some form, and it has been found that quite a variation exists in the curl, as to extent of curl, and the overall diameter of the ends after curling. While, where the ends are die curled by bending the entire edge of the flange at once, instead of progressively as is the case with rollers, the metal seems to take a set that produces can ends having only infinitesimal differences in diameter and extent of curl, and it has been found by experiment that the more nearly alike the curled edges are, the easier it is to produce perfect hermetic double seams.

It will be manifest from the foregoing that the end when it receives the gasket liner is in unfinished condition,—that is to say, it is necessary to complete the formation of the edge flange to hold the liner in place. Incidental to the completion of this edge flange the entire end is trued in the action of the die and the opening left in the inturning of the end is accurately gaged since all parts of the edge are positively bent in simultaneously.

It is thought that the invention and many of its attendant advantages will be understood from the foregoing description, and it will be apparent that various changes may be made in the form, construction and arrangement of the parts without departing from the spirit and scope of the invention or sacrificing any of its material advantages, the form hereinbefore described being merely a preferred embodiment thereof.

I claim:

1. In a machine for cutting can end liners from thin, flat material and assembling the same with shouldered and flanged can ends, the combination of cutting members, means for advancing liner forming material between said cutting members, mechanism for actuating said cutting members to cut a gasket liner from said material and apply the same directly on to the flange of the can ends at the cutting station and means for curling the edges of said can ends simultaneously at all points of their circumference to loosely inclose the applied liners.

2. In a machine for applying can end liners to can ends, the combination of mechanism for assembling gasket liners upon the flanges of said can ends, and die means embracing the periphery of the can end and independent of and coöperating with said assembling mechanism for inturning the flange edge of said can end simultaneously at all points to loosely confine and retain said gasket liners within the recess formed by the inturning of said edge.

3. In a machine for assembling gasket liners with can ends, the combination of means for forming gasket liners and assembling them with the can ends, and die means independent of and coöperating with said assembling mechanism engaging simultaneously the entire edge of the flange of a can end and inturning the same to loosely secure said gasket liner to said can end.

4. In a machine for cutting can end liners from thin, flat material and assembling the same with shouldered and flanged can ends, the combination of cutting members, means for advancing liner forming material between said cutting members, mechanism for actuating said cutting members to cut a gasket liner from said material and apply the same directly on to the flange of the can ends at the cutting station and means for curling the edges of said can ends to loosely inclose the applied liners, said curling means comprising a pressure element which is movable in a line parallel with the movement of said gasket-applying means.

5. In a machine for cutting can end liners from thin, flat material and assembling the same with shouldered and flanged can ends, the combination of cutting members, means for advancing liner forming material between said cutting members, mechanism for actuating said cutting members to cut a gasket liner from said material and apply the same directly on to the flange of the can ends at the cutting station and means for curling the edges of said can ends to loosely inclose the applied liners, said curling means comprising a pressure element which is movable in a line parallel with and opposite to the movement of said gasket-applying means.

6. In a machine for applying gasket liners to can ends, the combination of cutters adapted to cut a ring liner from suitable liner material and apply same to the flange of an unfinished can end, a die for finishing the formation of said end and inclosing the edge of the gasket within the edge of the flange, and means for causing said die to act with pressure in the direction of the longitudinal axis of the can end.

7. The combination of an intermittently rotatable turret having orifices adapted to receive and transport flanged and uncurled can ends, said orifices being formed with flange curling die surfaces, means for intermittently feeding a web of paper past said orifices at a ring liner cutting station, means at said station coöperating with said orifices for cutting ring liners and depositing them in said can ends, means for feeding can ends to the orifices of the turret, and means for moving the can ends against said die surfaces after they have received said ring liners to thereby cause the flanges of the can ends to retain the ring liners.

8. The combination of an intermittently rotatable turret having orifices adapted to receive and transport flanged and uncurled can ends, said turret being formed with flange curling die surfaces and can end guides leading to a position for the can end which is in line with said orifices and die surfaces, means for intermittently feeding a web of paper past said orifices at a ring liner cutting station, means at said station coöperating with said orifices for cutting ring liners and depositing them in said can ends, means for feeding can ends to said guides and to said position, and means for moving the can ends against said die surfaces after they have received said ring liners.

9. The combination of an intermittently rotatable turret having orifices adapted to receive and transport flanged and uncurled can ends, said orifices being formed at their under sides with flange curling die surfaces, means for intermittently feeding a web of paper over said orifices at a ring liner cutting station, means at said station coöperating with said orifices for cutting ring liners and depositing them in said can ends, means for feeding can ends to the orifices of the turret, and means for elevating the can ends against said die surfaces after they have received said ring liners.

10. The combination of an intermittently rotatable turret having orifices adapted to receive and transport flanged and uncurled can ends, said orifices being formed at their under sides with flange-curling die surfaces, means for intermittently feeding a web of paper over said orifices at a ring liner cutting station, means at said station coöperating with said orifices for cutting ring liners and depositing them in said can ends, core cutting means operating on said web in advance of the operation of the ring liner cutting means, means for feeding can ends to the orifices of the turret, and means for elevating the can ends against said die surfaces after they have received said ring liners.

11. The combination of a die having a pocket adapted to hold a can end formed with a peripheral longitudinal flange, means for depositing in said pocket a can end and a ring liner on said can end within said flange, said pocket being formed with a peripheral curved die surface adapted to curl said flange inward, and means for causing pressure between the said flange of the can end and the said die surface.

12. In a can end lining machine, the combination of a die having a pocket adapted to receive a flanged can end and a ring liner superposed thereon, said pocket having a curved die surface which overhangs and opposes the peripheral edge of the can end, means for feeding a can end and a ring liner successively to said pocket, and means for causing endwise curling pressure between the said flange and the said die surface.

13. The combination of a carrier having pockets adapted to hold can ends formed with a peripheral longitudinal flange, means for depositing ring liners on said can ends within said flange while the can ends are in said pockets, said pockets being formed with a peripheral curved die surface adapted to curl said flange inward, and means for causing pressure between the said flange of the can and the said die surface.

14. The combination of a turret having an intermittent movement and pockets adapted to hold can ends formed with a peripheral longitudinal flange, means for depositing ring liners on said can ends within said flange while the can ends are in said pockets, said pockets being formed with a peripheral curved die surface adapted to curl said flange inward, and means for causing pressure between the said flange of the can end and the said die surface.

15. The combination of a die having a pocket adapted to hold a can end formed with a peripheral longitudinal flange, means for depositing in said pocket a can end and a ring liner on said can end within said flange, said pocket being formed with a peripheral curved die surface adapted to curl said flange inward, means for causing pressure between the said flange of the can and the said die surface, ring liner forming mechanism arranged to deliver ring liners successively to said pocket, and means for delivering can ends successively to said pocket.

16. In a can end lining machine, the combination of a die having a pocket adapted to receive a flanged can end and a ring liner superposed thereon, said pocket having a curved die surface which overhangs and opposes the peripheral edge of the can end, means for causing endwise curling pressure between the said flange and the said die surface, ring liner forming mechanism arranged to deliver ring liners successively to said pocket, and means for delivering can ends successively to said pocket.

17. The combination of a carrier having pockets adapted to hold can ends formed with a peripheral longitudinal flange, ring liner forming means arranged for depositing ring liners on said can ends within said flange while the can ends are in said pockets, said pockets being formed with a peripheral curved die surface adapted to curl said flange inward, and means for causing pressure between the said flange of the can end and the said die surface.

18. The combination of a turret having an intermittent movement and pockets adapted to hold can ends formed with a peripheral longitudinal flange, ring liner forming means for depositing ring liners on said can ends within said flange while the can ends are in said pockets, said pockets being formed with a peripheral curved die surface adapted to curl said flange inward, means for causing pressure between the said flange of the can end and the said die surface, and means for feeding can ends to said pockets.

19. In a machine for lining can ends, the combination of an apertured die member having a can end edge curling die portion arranged peripherally in the aperture, a plunger for operating in line with said aperture, means for causing relative movement between said member and plunger to curl the flange edge of a can end by means of said die portion, means for placing ring liners into said aperture and onto the flange of said can end in a direction opposite to the operative movement of said plunger before the curling operation of the die, and means for feeding can ends into position between said die portion and said plunger.

20. A method of manufacturing a gasket lined can end, consisting in the provision of an unlined and flanged can end, cutting a gasket liner from flat material, placing said can end and gasket liner in desired relation with the liner on said flange, and completing the formation of said end to secure said liner thereto by inturning all parts of the extreme edge of said end simultaneously by pressure applied directly on said edge, and to such limited extent as to leave the inturned edge out of contact with the gasket liner.

21. A method of manufacturing a gasket lined can end, consisting in the provision of an unlined and flanged can end, cutting a gasket liner from flat material, placing said can end and gasket liner in desired relation with the liner on said flange, and completing the formation of said end to secure said liner thereto by inturning all parts of the extreme edge of said end simultaneously by pressure applied directly on said edge, said inturning operation leaving the liner free for rotation relative to said can end.

22. The method of manufacturing a gasket lined can end, which consists in assembling a gasket ring liner with a can end having an upstanding flange by pressure in the direction of the axis of the can end and liner, and thereafter inturning the extreme edge of the upstanding flange of the can end by pressure also in said axial direction and to such limited extent as to leave the ring liner loose and movable within said inturned flange, and thereby confining the liner loosely within the flange of the can end.

Signed.

CHARLES W. GRAHAM.